United States Patent
Jia et al.

(10) Patent No.: US 12,168,749 B2
(45) Date of Patent: Dec. 17, 2024

(54) CROSS-LINKED PLUGGING AGENT STIMULATED BY HIGH DENSITY BRINE AND PREPARING METHOD THEREOF

(71) Applicant: Southwest Petroleum University, Sichuan (CN)

(72) Inventors: Hu Jia, Sichuan (CN); Shangkun Dai, Sichuan (CN)

(73) Assignee: Southwest Petroleum University, Sichuan (CN)

( * ) Notice: Subject to any disclaimer, the term of this patent is extended or adjusted under 35 U.S.C. 154(b) by 293 days.

(21) Appl. No.: 17/505,659

(22) Filed: Oct. 20, 2021

(65) Prior Publication Data
US 2022/0041916 A1  Feb. 10, 2022

Related U.S. Application Data

(63) Continuation of application No. PCT/CN2020/076004, filed on Feb. 20, 2020.

(30) Foreign Application Priority Data

Feb. 17, 2020 (CN) .......................... 202010094980.1

(51) Int. Cl.
*C09K 8/42* (2006.01)
*C09K 8/512* (2006.01)
*C09K 8/516* (2006.01)
*E21B 33/13* (2006.01)

(52) U.S. Cl.
CPC .............. *C09K 8/426* (2013.01); *C09K 8/512* (2013.01); *C09K 8/516* (2013.01); *E21B 33/13* (2013.01)

(58) Field of Classification Search
CPC ........ C09K 8/426; C09K 8/512; C09K 8/516; E21B 33/13; C04B 28/344; C04B 22/0026; C04B 24/38
See application file for complete search history.

(56) References Cited

FOREIGN PATENT DOCUMENTS

CN          107642357 A    *  1/2018

* cited by examiner

*Primary Examiner* — K. Boyle

(57) ABSTRACT

The present invention disclosed a cross-linked plugging agent stimulated by high density brine which comprises: main agent: 21 wt %-53 wt %, gelling agent: 0.5 wt %-9 wt % and pure water; wherein the saline solution is selected from the group consisting of a Dipotassium phosphate ($K_2HPO_4$), a Tripotassium phosphate ($K_3PO_4$) and a Potassium pyrophosphate ($K_4P_2O_7$); the gelling agent is selected from the group consisting of a Xanthan gum and a kappa carrageenan. The gelling time is controlled within 0.5-12 h under an experiment temperature of 90° C.-160° C. The final gelling strength is controlled within D-H. The density is controlled within 1.2-1.55 g/cm$^3$.

2 Claims, 4 Drawing Sheets

CROSS-LINKED PLUGGING AGENT STIMULATED BY HIGH DENSITY BRINE AND PREPARING METHOD THEREOF

CROSS REFERENCE OF RELATED APPLICATION

This is a Continuation Application of the International Application PCT/CN2020/076004, filed Feb. 2, 2020, which claims priority under 35 U.S.C. 119(a-d) to CN 202010094980.1, filed Feb. 17, 2020.

BACKGROUND OF THE PRESENT INVENTION

Field of Invention

The present invention relates to oilfield chemistry, which is widely applied in well completion and workover under high temperature, high pressure, multi-pressure oil and gas environment and is applied in temporary blocking agent, perforating protect fluid and water shutoff agent. The present invention is more particularly related to the cross-linked plugging agent stimulated by high density brine and the preparing method thereof.

Description of Related Arts

The reservoir development goes deeper and deeper to reach deep and ultra-deep formation where the geological condition is complicate and prone to change. Many challenges and difficulties need to be dealt with such as high temperature, high pressure, multi-pressure environment in reservoir. In case of a well with ultra high pressure, the contradiction of well killing and fluid loss in low-pressure reservoir is the main technical difficulty which results in high cost during well completion and workover. According to the conventional principles, in case of multi-pressure oil and gas reservoir with ultra high pressure, well killing fluid is planned in advance and the killing fluid is selected based on the principle of 'the pressure of killing fluid need to be higher than reservoir'. The high density killing fluid column brings high positive pressure on the low-pressure reservoir when the well control requirement is fulfilled. The high density killing fluid would leak into the low-pressure reservoir if the differential of pressure is bigger than the pressure bearing limitation of the reservoir. The fluid loss result in more requirements of killing fluid to keep the pressure, which increases the cost. In serious condition, the fluid loss damages the reservoir and reduces the outcome. In an even more serious condition, the fluid loss induces safety risk. The plugging and leak-prevention technology for high-density well killing fluid is critical in workover and well completion operations under high temperature and multi-pressure environment.

Well completion and workover in the high temperature and multi-pressure reservoir requires high performance plugging agent. On one hand, the plugging agent can deal with compatibility and floating problem caused by high density killing fluid used in workover and well completion operations in high pressure formation. On the other hand, the plugging agent is able to meet the requirements such as high temperature and salt endurance, easy to prepare, controllable plugging strength, low cost and environmentally friendly.

The conventional preparing method of the high density plugging agent applied on site falls into the below two categories.

(1) One of the conventional preparing method of plugging agent for high temperature and pressure well killing is based on haloid which is mainly Zinc bromide ($ZnBr_2$), Zinc chloride ($ZnCl_2$), Sodium bromide (NaBr), Calcium bromide ($CaBr_2$), Calcium chloride ($CaCl_2$) and so on, which is still an important technical objective for different big drilling fluid companies to reach and related research is carried out due to lack of corresponding strategy for deep reservoir. Technical contests are carried out and each company has its own formula which is well-kept secret. Although each company has its own production code and product naming convention, the research theory and technology adopted is similar. For example, Zhiliang Zhou uses sulfonated phenolic resin (SMP-II), calcium carbonate ($CaCO_3$), carboxymethyl cellulose (CMC) and so on with $ZnBr_2$ to prepare high density low damage plugging agent; Kexiang Peng uses SMP-II, sulfonated wood coal (SMC), sulfonated resin modified filtrate reducer GJL-1 and GJL-2 with $ZnBr_2$ compound to prepare filtrate reducing high density plugging agent. Haloid especially bromide solution is highly corrosive under high temperature and high density environment and difficult to degrade, which accumulates in food chain and is not environmentally friendly. Environment protection is more and more urgent than ever before and the conventional bromide high density plugging agent is gradually replaced by new low damage and pollution plugging agent.

(2) Plugging agent prepared based on formate.

Two types of plugging agents prepared based on formate (mainly potassium formate, cesium formate and etc.) are used in large scale. One is thickening plugging agent which is prepared by adding polymer into the formate water system to increase viscosity of the killing fluid and to reduce killing fluid filtration and loss in the low permeability reservoir, such as 4 mate series of acrylamide-sulfonated methyl propane copolymer system, xanthan gum system, CMC system and etc. produced by Cabot Corporation. The application of this type of plugging agent is limited and this type of plugging agent is not able to be used under high pressure difference. The other type is bridge plugging agent. The plugging agent dissolves in the formate water system to form small granules. One or more sizes of small granules form a bridge on the fluid loss formation, such as fine mesh calcium carbonate, modified graphite "G-Seal", which is a mixture of, various cellulose and high strength granules. The size of the granule is important. If the size of the granule is not selected carefully, the granules easily enter the reservoir and damage the reservoir. Although the plugging agent prepared based on formate has the advantages of wide density range and effectively protecting the reservoir, the price of the formate especially cesium formate is much higher than halide salt, which restrict the use of the plugging agent.

SUMMARY OF THE PRESENT INVENTION

An object of the present invention is to provide a cross-linked plugging agent stimulated by high density brine and preparing method thereof. The present invention adopts the main agent to stimulate the gelling agent to cross link without the extra use of other crosslinking agents such as phenol formaledlyde, chromium (III) acetate and polyethyleneimine (PEI). The present invention of the cross-linked plugging agent stimulated by high density brine and the preparing method thereof is able to be applied in operations under high temperature, high pressure, multi-pressure series of strata oil and gas environment when temporary blockage and leak proof is required, protection of reservoir near perforations and water plugging. The advantages of the plugging agent of the present invention are being able to be easily prepared on site, controllable gel forming time and degradation time under high temperature and high salt density, and rapid core permeability recovery after flowback.

To solve the problems of the conventional technology, the present invention provide the below technical solution.

The cross-linked plugging agent stimulated by high density brine, comprising:

main agent: 21 wt %-53 wt %, gelling agent: 0.5 wt %-9 wt % and pure water.

Furthermore, the main agent is selected from the group consisting of a Dipotassium phosphate ($K_2HPO_4$), a Tripotassium phosphate ($K_3PO_4$), and a Potassium pyrophosphate ($K_4P_2O_7$).

Furthermore, the gelling agent is selected from the group consisting of a Xanthan gum and a kappa carrageenan.

The process of preparing a cross-linked plugging agent stimulated by high density brine comprises the following steps of:

adding main agent, gelling agent into pure water in sequence with respective percentage by mass; stirring evenly; setting an experiment temperature at 90° C.-160° C.; controlling the gel forming time within 0.5-12 hours; determining the gel forming time and the gel forming strength of the plugging agent by gel strength codes. The final forming strength is controlled within flowing gel (gel strength code C) to slightly deformation non flowing gel (gel strength code H). The density of the plugging agent system is able to be controlled within 1.2 $g/cm^3$-1.55 $g/cm^3$.

Three type of reactions—occur as below: the main agent dissolves in the pure water and releases large quantity of ions; the ions and the gelling agent cross linked to form covalent bonds; the molecular chains of various gelling agents are entangled to form compound synergist; hydrogen bond is formed between the molecular of the plugging agent and the water molecular and the plugging agent system obtains water absorption feature. The three type of reactions work together to form the cross-linked plugging agent stimulated by high density brine.

The components in the cross-linked plugging agent stimulated by high density brine do not need to be prepared in advance. The plugging agent is able to be prepared on site conveniently and the process is easy to be carried out. The main agent dissolves in the pure water to form brine which stimulates the gelling agent to induce a cross linking reaction and form a cross-linked plugging agent by compound synergy. The cross-linked plugging agent is able to endure high temperature and density salt and the gel forming strength is controllable.

The gel forming time and gel forming strength is decided according to the Gel Strength Codes (GSC) proposed by Sydansk and others in 1988. The gel forming time is decided by observing the gel forms. The initial gelation time refers to the period while the form of the gelling agent changing from no detachable gel (A) to highly flowing gel (B). The final gelation time refers to the period while the form of the gelling agent changing from original polymer solution to the final strength. Normally, the gel forming time refers to the period when most of the gelling agent flows to the bottle cap by gravity upon inversion (C).

TABLE 1

Gel Strength Codes

| Gel strength code | Gel name | Gel description |
| --- | --- | --- |
| A | No detectable gel | No detectable gel formed: The gel appears to have the same viscosity as the original polymer solution |
| B | Highly flowing gel | The gel appears to be only slightly more viscous than the initial polymer solution |
| C | Flowing gel | Most of the gel flows to the bottle cap by gravity upon inversion |
| D | Moderately flowing gel | Only a small portion (<15%) of the gel dose not flow to the bottle by gravity upon inversion (usually characterized as tonguing gel) |
| E | Barely flowing gel | The gel can barely flow to the bottle cap and or a significant portion (>15%) of the gel does not flow by gravity upon inversion |
| F | Highly deformable non flowing gel | The gel does not flow to the bottle cap by gravity upon inversion |
| G | Moderately deformable non flowing gel | The gel deforms about half way down the bottle by gravity upon inversion |
| H | Slightly deformable non flowing gel | Only the gel surface slightly deforms by gravity upon inversion |
| I | Rigid gel | There is no gel surface deformation by gravity upon inversion |
| J | Ringing rigid gel | A tuning fork-like mechanical vibration can be felt upon tapping the bottle |

The thermal stability of the cross-linked plugging agent stimulated by high density is good. All components of the plugging agent are innoxious and harmless. The degradation of the plugging agent is controllable. The corrosion of the oil tubing and casing by the plugging agent is little. The plugging agent is able to be widely applied in operations such as well completion and workover when temporary blockage and leak proof is required, protection of reservoir near perforations and water shutoff and profile control under high temperature, high pressure, multi pressure series of strata oil and gas environment.

Compared to the conventional technology, the present invention has the following benefits:
(1) all the components are instant soluble, easy to prepare and operate;
(2) the costs of all the components is lower than bromate plugging agent and formate plugging agent and the plugging agent is price competitive.
(3) the material safety data sheet (MSDS) of each component fulfils the requirements for food; the plugging agent is innoxious, harmless, corrosion-free and non pollutive; the degradation of the plugging agent is controllable; the plugging agent is oil casing friendly and ecofriendly;
(4) the cross-linked plugging agent stimulated by high density brine is applied in a temperature range 90° C.-160° C.; the gel forming time is controlled within 0.5-12 hours; the final gelation strength is controllable within GSC C to H; the plugging agent is controllable for degradation within 20-168 hours after the plugging task is completed.
(5) the viscosity of the plugging agent is less than 100 mPa·s before gelation and the pumpability is good; the plugging agent system is a solid-free fluid after degradation, the viscosity of which is less than 50 mPa·s; the plugging agent is able to be discharged in well flushing cycle without residue and effectively protect the reservoir.

DETAILED DESCRIPTION OF THE PREFERRED EMBODIMENT

The below embodiments further explain the present invention. The embodiments are based on the present invention and give detailed explanation. The protection scope of the present invention does not limited by the below embodiments.

A cross-linked plugging agent stimulated by high density brine comprises:
  main agent: 21 wt %-53 wt %, gelling agent: 0.5 wt %-9 wt % and pure water.

The main agent is selected from the group consisting of a Dipotassium phosphate ($K_2HPO_4$), a Tripotassium phosphate ($K_3PO_4$), and a Potassium pyrophosphate ($K_4P_2O_7$).

The gelling agent is selected from the group consisting of a Xanthan gum and a kappa carrageenan.

The cross-linked plugging agent stimulated by the high density brine is able to be applied in well completion and workover under high temperature, high pressure, multi pressure oil and gas environment when temporary blockage and leak proof is required, protection of reservoir near perforations and water plugging, which is exclusively designed according to geological characteristics of the reservoir, well temperature and plugging agent consumption. The plugging agent is prepared by the following steps of: adding main agent, gelling agent into pure water in sequence with respective percentage by mass; stirring evenly; setting an experiment temperature at 90° C.-160° C.; and determining a gel forming time and a gel forming strength of the plugging agent by gel strength codes.

Embodiment 1

A cross-linked plugging agent stimulated by high density brine for temporary blockage comprises the mixture of main agent of 47 wt %, gelling agent of 5 wt %-8 wt % and pure water. The experiment temperature is 120° C. The gel forming time and a gel forming strength are shown in the below table 2.

TABLE 2 gel forming time and a gel forming strength in embodiment 1

| Gelling agent content | Aging time/gel strength code | | | | | | | | |
|---|---|---|---|---|---|---|---|---|---|
| Wt % | Initial | 2 h | 4 h | 12 h | 1D | 3D | 5D | 7D | 9D | 12D |
| 5 | A | E | F | F | G | G | G | G | G | G |
| 6 | A | E | F | G | G | G | G | G | G | G |
| 7 | A | F | G | H | H | H | H | H | H | H |
| 8 | A | G | H | H | H | H | H | H | H | H |

As shown in Table 2, the gel forming time is within 2 hours; the final forming strength is G to H; no syneresis happens within 12 days.

Figure 1:
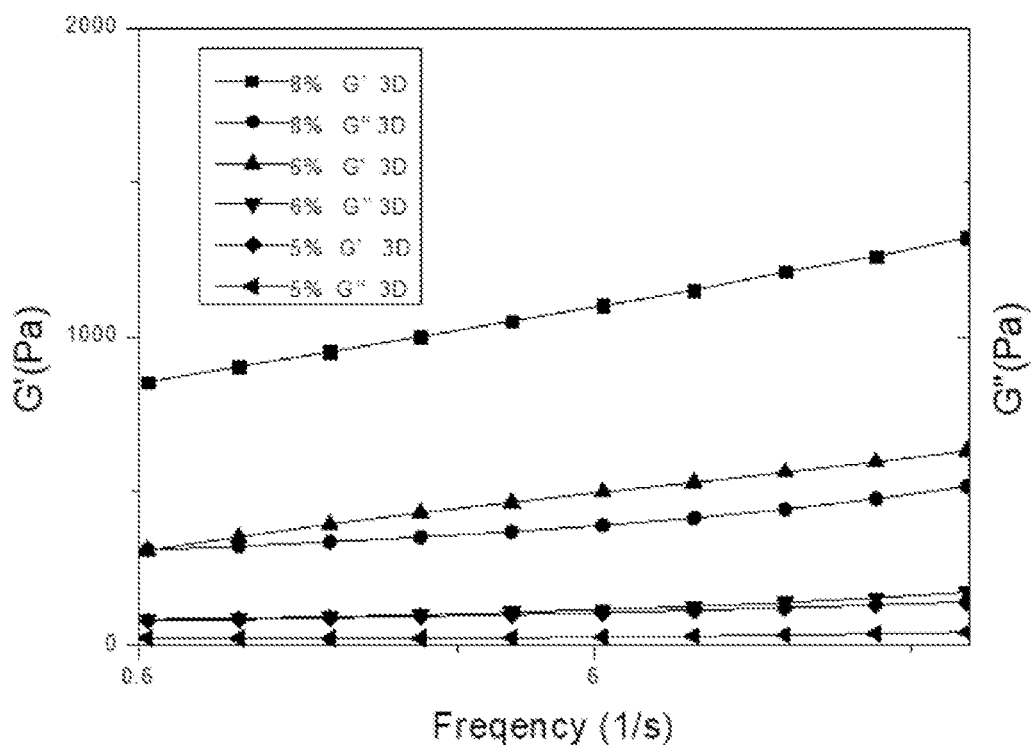
FIG. 1 illustrates values of elastic modulus and loss modulus in embodiment 1 of various gelling agent content after aging for three days at 120° C. and then cool to room temperature, G' is elastic modulus and G" is viscous modulus.

As shown in FIG. 1, the values of elastic modulus and loss modulus of various gelling agent content after aging for three days and the cool to room temperature prove that the strength of the plugging agent is able to be adjusted by adjusting the gelling agent content.

Embodiment 2

A cross-linked plugging agent stimulated by high density brine for protection of reservoir near perforations comprises main agent of 47 wt %, gelling agent of 2 wt %-4 wt % and pure water. The experiment temperature is 120° C. The gel forming time and a gel forming strength are shown in the below Table 3.

TABLE 3 gel forming time and a gel forming strength in embodiment 2

| Gelling agent content | Aging time/gel strength code | | | | | |
|---|---|---|---|---|---|---|
| Wt % | Initial | 4 h | 8 h | 1D | 2D | 3D | 4D |
| 2 | A | B | D | D | D | D | D |
| 3 | A | B | D | D | D | D | D |
| 4 | A | B | E | E | E | E | E |

As shown in table 3, the gel forming time is within 4-8 hours; the final forming strength is D or E; no syneresis happens within 7 days. The plugging agent is able to be applied in protection of reservoir near perforations when different gel strength is required.

Figure 2:
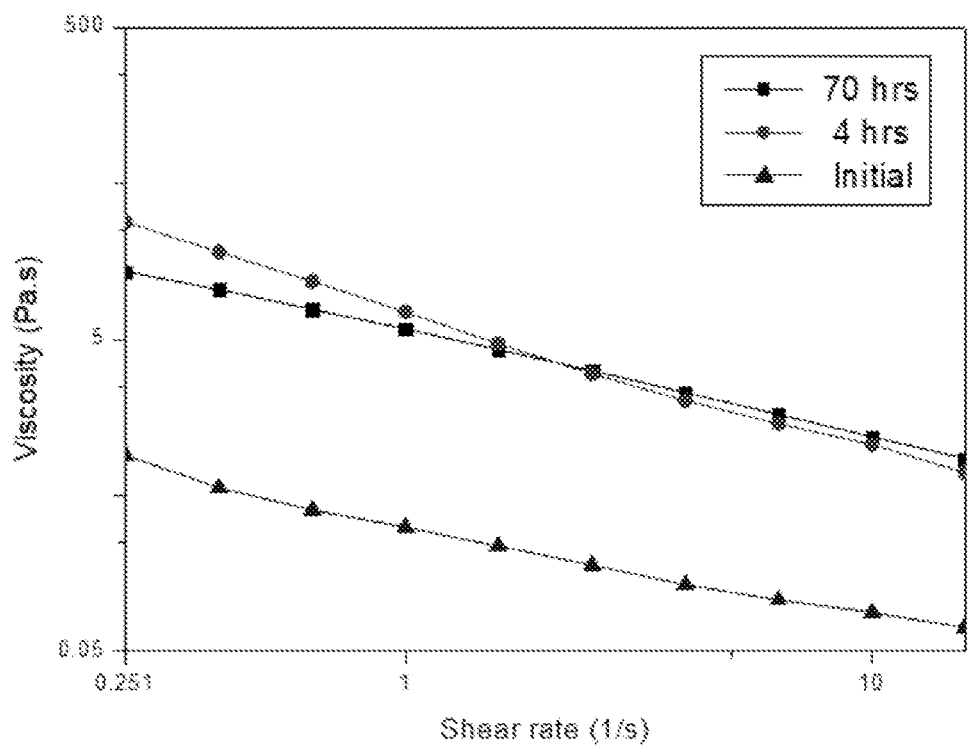
FIG. 2 is a curve chart which displays viscosity and shear force of the plugging agent with 3 wt % of gelling agent content at the initial time, after four hours and after 70 hours in embodiment 2.

As shown in FIG. 2, the experiment temperature is 120° C. The viscosity and shear force curve of the plugging agent with 3 wt % of gelling agent content at the initial time, after four hours and after 70 hours illustrates the viscosity of the plugging agent at the initial time is below 100 mPa·s and is able to be pumped easily; the viscosity of the plugging agent increases significantly after 4 hours and the plugging agent is high viscosity liquid; The viscosity of the plugging agent is slightly reduced after aging 70 hours. But it is still in high-viscous state, which can maintain plugging performance. Overall, the viscosity of the plugging agent keeps stable within 70 hours at high temperature.

Embodiment 3

A cross-linked plugging agent stimulated by high density brine for temporary blockage comprises main agent of 47 wt %, gelling agent of 5 wt %-8 wt % and pure water. The experiment temperature is 90° C. The gel forming time and a gel forming strength are shown in the below table 4.

TABLE 4 gel forming time and a gel forming strength in embodiment 3

| Gelling agent content | Aging time/gel strength code | | | | | | | |
|---|---|---|---|---|---|---|---|---|
| Wt % | Initial | 2 h | 4 h | 12 h | 1D | 3D | 5D | 7D |
| 5 | A | D | F | G | G | G | G | G |
| 6 | A | D | G | G | G | G | G | G |
| 7 | A | E | G | G | H | H | H | H |
| 8 | A | F | G | H | H | H | H | H |

As shown in table 4, the gel forming time is within 2 hours; the final forming strength is G or H; no syneresis happens within 7 days. The plugging agent is able to be applied in temporary blockage and water plugging when different gel strength is required.

Embodiment 4

A cross-linked plugging agent stimulated by high density brine for protection of reservoir near perforations comprises main agent of 47 wt %, gelling agent of 2 wt %-4 wt % and pure water. The experiment temperature is 160° C. The gel forming time and a gel forming strength are shown in the below table 5.

TABLE 5 gel forming time and a gel forming strength in embodiment 4

| Gelling agent content | Aging time/gel strength code | | | | | |
|---|---|---|---|---|---|---|
| Wt % | Initial | 2 h | 4 h | 12 h | 1D | 3D |
| 2 | A | A | B | B | B | A |
| 2.5 | A | A | C | D | syneresis D syneresis | A |
| 3.5 | A | B | D | E | E syneresis | B |
| 4 | A | C | D | E | E syneresis | C |

As shown in table 5, the gel forming time is within 2-4 hours; the final forming strength is B to E.

Embodiment 5

A cross-linked plugging agent stimulated by high density brine for temporary blockage comprises main agent of 53 wt %, gelling agent of 5 wt %-8 wt % and pure water. The experiment temperature is 90° C. The gel forming time and a gel forming strength are shown in the below table 6.

TABLE 6 gel forming time and a gel forming strength in embodiment 5

| Gelling agent content | Aging time/gel strength code | | | | | | | | |
|---|---|---|---|---|---|---|---|---|---|
| Wt % | Initial | 2 h | 4 h | 12 h | 1D | 3D | 5D | 7D | 9D | 12D |
| 5 | A | D | F | F | G | G | G | G | G | G |
| 6 | A | D | F | G | G | G | G | G | G | H |
| 7 | A | E | G | H | H | H | H | H | H | H |
| 8 | A | F | H | H | H | H | H | H | H | H |

As shown in table 6, the gel forming time is within 2 hours; the final forming strength is G or H; no syneresis happens within 7 days. The plugging agent is able to be applied in temporary blockage and water plugging when different gel strength is required.

Figure 3:
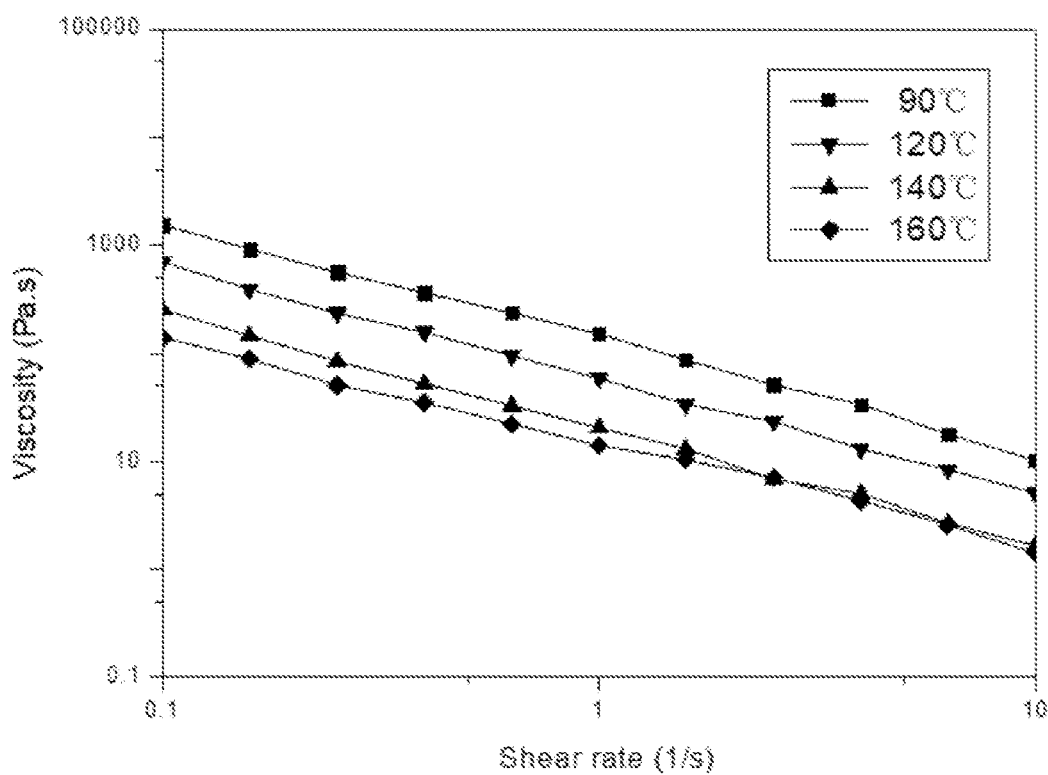
FIG. 3 is a shear-viscosity curve chart of a cross-linked plugging agent stimulated by high density brine in 4 hours under different temperature in embodiment 6.

Embodiment 6: the Relation of Shear Force and Viscosity of the Cross-Linked Plugging Agent Stimulated By High Density Brine Under Different Temperature is as Below The formula of the plugging agent stimulated by high density brine in the embodiment is main agent of 1.5 g/cm$^3$ and gelling agent of +6 wt %. The prepared plugging agent is put into a laboratory oven ageing for four hours under 90° C., 120° C., 140° C., and 160° C. respectively and wait them cooling to room temperature. The observed viscosities are shown in the FIG. 3. The plugging agent is assumed to be pumped to the objective reservoir in four hours. FIG. 3 shows the status and changing rules of the plugging agent after the plugging agent passes through the casing or oil tube and reaches the objective reservoir. The viscosity of the plugging agent sample decrease with the rising temperature after ageing for four hours, which reaches the magnitude of 10$^4$ mPa·s. The plugging agent is in a semi-solid status, which does not easily loss in the reservoir and is able to bear pressure.

Figure 4:
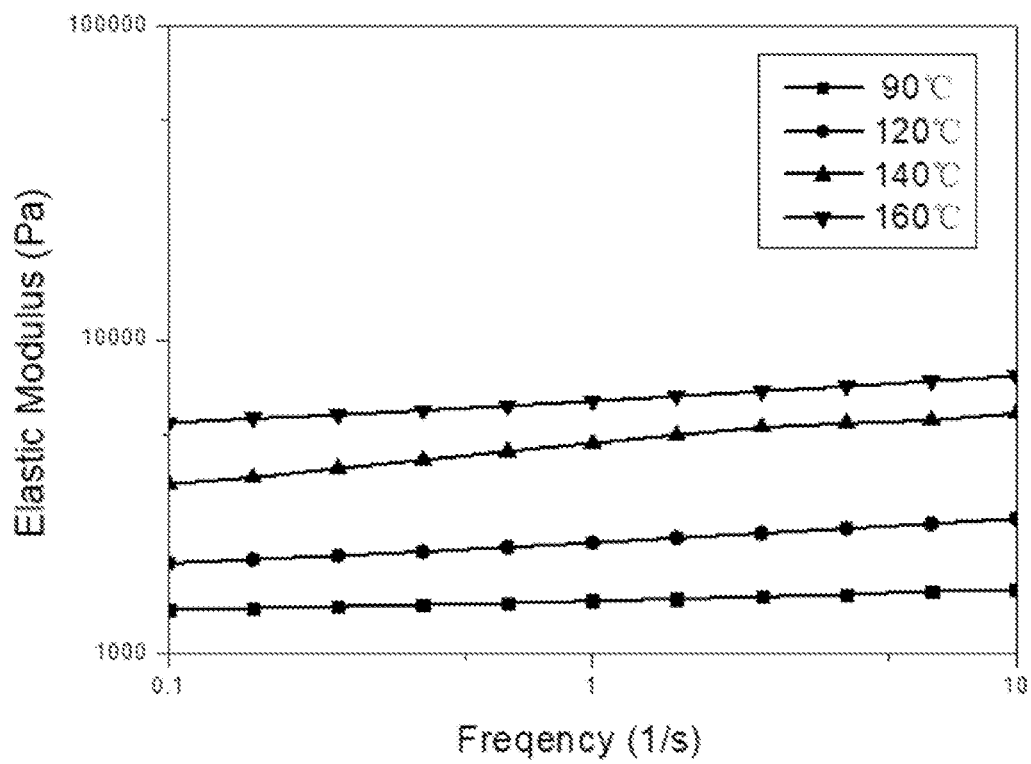
FIG. 4 is an elastic modulus curve chart of the cross-linked plugging agent stimulated by high density brine in 4 hours under different temperature in embodiment 7.
Figure 5:
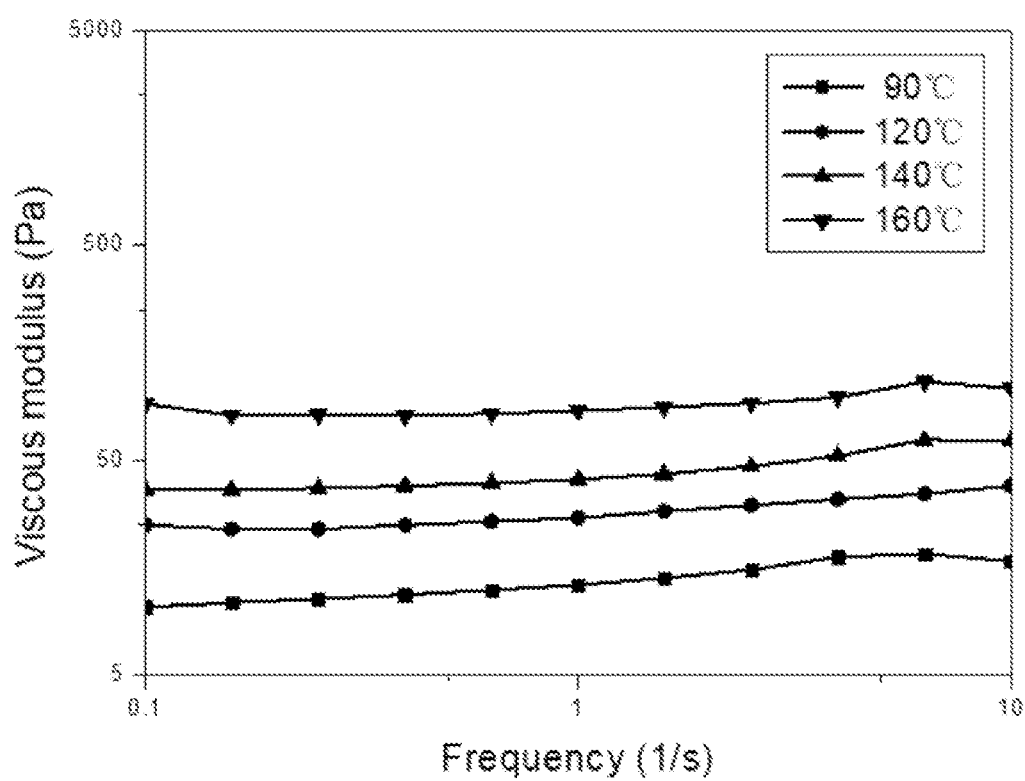
FIG. 5 is a viscous modulus curve chart of the cross-linked plugging agent stimulated by high density brine in 4 hours under different temperature in embodiment 7.

Embodiment 7: the Elastic and Loss Features of the Cross-Linked Plugging Agent Stimulated By High Density Brine Under Different Temperature The formula of the plugging agent stimulated by high density brine in the embodiment is the main agent of 1.5 g/cm$^3$ and gelling agent of +6 wt %. The prepared plugging agent is put into a laboratory oven ageing for four hours under 90° C., 120° C., 140° C., and 160° C. respectively and wait them cooling to room temperature. The observed elastic and viscous modulus are shown in the FIG. 4 and FIG. 5. The elastic modulus of the plugging agent reaches 10$^3$ Pa magnitude which is high enough to fulfill the requirement for temporary blockage and leak-off control under positive pressure difference (no fluid loss was observed under 20 MPa positive pressure difference after core temporary plugged as shown in embodiment 8).

Embodiment 8

The formula of the plugging agent stimulated by high density brine in the embodiment is the main agent of 1.5 g/cm$^3$ and gelling agent of +6 wt %. The core (with saturated formation water) is put in an integrated displacement equipment. Sufficient plugging agent solution was poured into the simulated wellbore to immerse the core front face. The system was sealed and aged for 4 hours at 120° C. And then, fresh water was injected to the top surface of the mature plugging agent to impose positive pressure. The chart 7 shows the observed the fluid loss from a back end of the core.

CHART 7 data sheet of the bearing capability of the core

| No. of core | $K_{gi(Dry)}/K_{gi(Swc)}$ (mD) | Pressure difference (MPa) | Fluid loss rate (ml/min) |
| --- | --- | --- | --- |
| 1 | 54.25/5.49 | 20 | 0 |
| 5 | 528/219 | 20 | 0.012 |
| 7 | 2056/961 | 20 | 0.05 | wherein $K_{gi(dry)}$ stands for the gas permeability of the dry core; $K_{gi(Swc)}$ stands for the gas permeability at irreducible water saturation $S_{wc}$.

After being blocked for two hours under a pressure difference of 20 MPa, filter cake forms on the contact surface of the core and the gelling agent. The filter cake prevents the gelling agent from leak deep into the core (no more than 3 mm-5 mm) and fluid loss. The permeability is able to be rapidly recovered after the filter cake is being removed.

Figure 6:
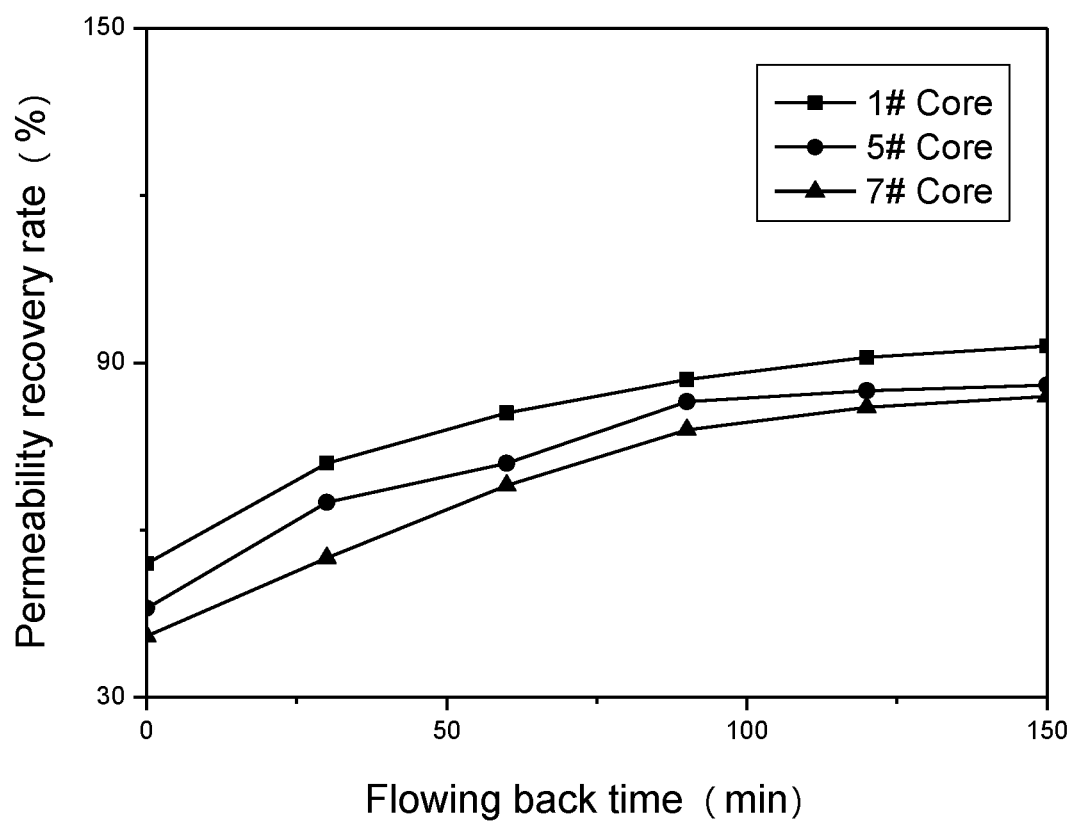
FIG. 6 is a curve chart which displays flowback time and core permeability recovery rate in embodiment 8.

Chart 8 and FIG. 6 show the core permeability recovery during gas flowback. The experimental result shows that the permeability recovery factor is at least 82% and the flow is induced under 3 MPa negative pressure difference.

CHART 8 the recovery of permeability of the core

| No. of core | $K_{gi(Swc)}$ (mD) | Flowback breakthrough pressure (MPa) | Permeability recover rate after two hours (%) |
| --- | --- | --- | --- |
| 1 | 5.49 | 2.74 | 91 |
| 5 | 219 | 2 | 85 |
| 7 | 961 | 1.8 | 82 |

The embodiments above are just an exemplary and based on the contrivance of the present invention. The embodiments are not a limitation of the present invention. All modifications and alterations are within the protection scope of the present invention.

What is claimed is:

1. A cross-linked plugging agent, comprising:
   a mixture of: 21 wt %-53 wt % of Potassium pyrophosphate ($K_4P_2O_7$) as a main agent; 5 wt %-9 wt % of Xanthan gum as a gelling agent; and pure water, wherein the amounts are based on the total weight of the crosslinked plugging agent, and wherein the mixture forms a high density brine.

2. The cross-linked plugging agent as recited in claim 1, wherein a density of the cross-linked plugging agent is 1.2-1.55 g/cm$^3$.

* * * * *